(12) United States Patent
Jacobsen

(10) Patent No.: US 8,701,260 B1
(45) Date of Patent: Apr. 22, 2014

(54) REMOVAL OF AIRCRAFT WINDOW REVEAL

(75) Inventor: Jenn A. Jacobsen, Arlington, WA (US)

(73) Assignee: The Boeing Company, Chicago, IL (US)

(*) Notice: Subject to any disclaimer, the term of this patent is extended or adjusted under 35 U.S.C. 154(b) by 378 days.

(21) Appl. No.: 13/327,632

(22) Filed: Dec. 15, 2011

Related U.S. Application Data

(60) Provisional application No. 61/425,741, filed on Dec. 21, 2010.

(51) Int. Cl.
 *B64C 1/14* (2006.01)
 *B23P 19/04* (2006.01)
 *B23P 19/00* (2006.01)

(52) U.S. Cl.
 USPC .................. 29/426.6; 29/426.4; 244/129.3

(58) Field of Classification Search
 CPC ............ B23P 19/00; B23P 19/04; B64C 1/14
 USPC ................ 29/426.4, 426.5, 426.6; 244/129.4, 244/129.3
 See application file for complete search history.

(56) References Cited

U.S. PATENT DOCUMENTS

| | | | | |
|---|---|---|---|---|
| 742,563 | A * | 10/1903 | Beehler ........................... | 292/86 |
| 3,971,237 | A * | 7/1976 | Rasmussen ...................... | 70/99 |
| 4,364,533 | A | 12/1982 | Pompei et al. | |
| 4,541,595 | A * | 9/1985 | Fiala et al. .................. | 244/129.3 |
| 6,082,674 | A * | 7/2000 | White et al. ................ | 244/129.3 |
| 6,786,453 | B2 * | 9/2004 | Jones .......................... | 244/129.3 |
| 6,789,765 | B2 * | 9/2004 | Hopkins et al. ............ | 244/129.3 |
| 6,793,182 | B2 * | 9/2004 | Hopkins et al. ............ | 244/129.3 |
| 7,118,069 | B2 | 10/2006 | Novak et al. | |
| 7,552,896 | B2 * | 6/2009 | Coak .......................... | 244/129.3 |
| 7,562,846 | B2 * | 7/2009 | Wood .......................... | 244/129.3 |
| 7,661,626 | B2 * | 2/2010 | Wood .......................... | 244/129.3 |
| 7,823,425 | B2 * | 11/2010 | Crossley ......................... | 70/80 |
| 7,823,833 | B2 * | 11/2010 | Wood ......................... | 244/129.3 |
| 8,087,615 | B2 * | 1/2012 | Wood ......................... | 244/129.3 |
| 8,112,879 | B2 * | 2/2012 | Morrison et al. .............. | 29/764 |
| 8,123,168 | B2 * | 2/2012 | Switzer et al. ............ | 244/129.3 |
| 8,157,214 | B2 * | 4/2012 | Schwarz et al. ........... | 244/129.3 |

OTHER PUBLICATIONS

Dan Ivanis, "Team finds a revealing solution to ongoing 777 interior challenge" Boeing Frontiers, Mar. 2009.

* cited by examiner

*Primary Examiner* — David Bryant
*Assistant Examiner* — Jason L Vaughan
(74) *Attorney, Agent, or Firm* — Hugh P. Gortler

(57) ABSTRACT

A window reveal is secured to an aircraft interior sidewall panel by a plurality of clips. Each clip engages a tab on the reveal. A method for removing the reveal includes using a tool to disengage the clips. The tool includes a tapered portion having tips separated by a notch. Using the tool includes inserting the tapered portion into a slot in the reveal with the tab received in the notch, and pressing the tips through the slot until a back of the notch abuts against the tab and stops the movement of the tips. The notch has a depth that allows the tips to press against the clip, yet stops the tips from damaging the clip.

3 Claims, 5 Drawing Sheets

FIG. 3a
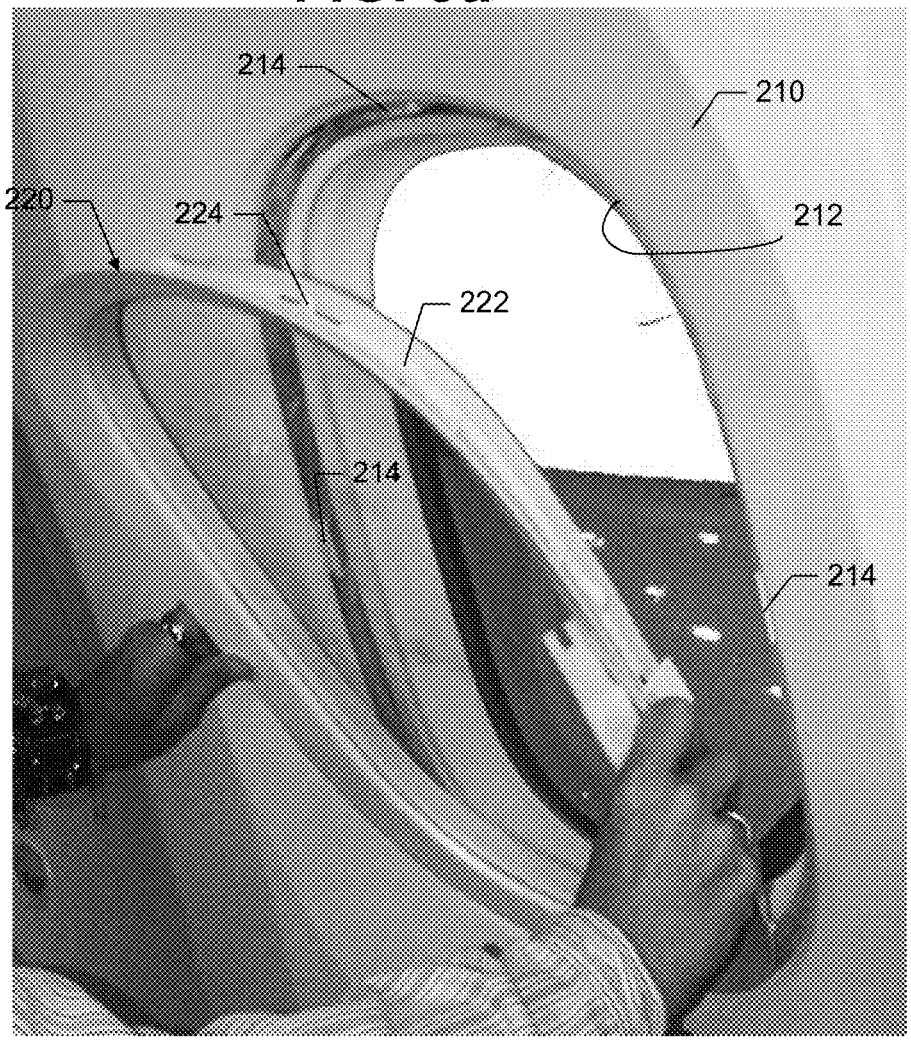
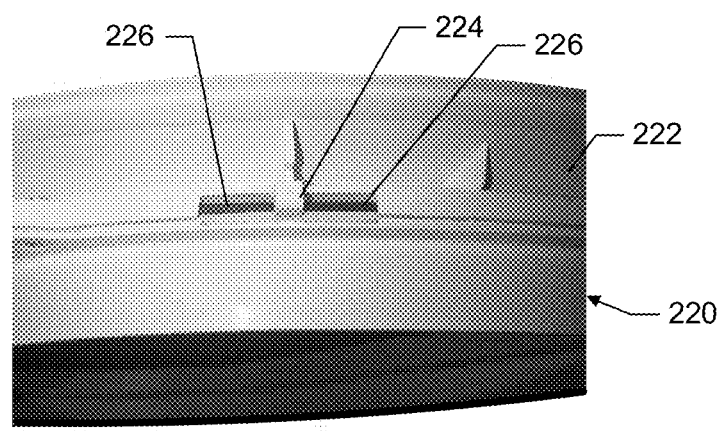
FIG. 3b

REMOVAL OF AIRCRAFT WINDOW REVEAL

This application claims the benefit of provisional application 61/425,741 filed Dec. 21, 2010.

BACKGROUND

Certain commercial aircraft are provided with electrochromic dimmable windows (EDWs) instead of mechanical pull down window shades. EDWs include electrochromic devices that change light transmission properties in response to voltage and thus allow control over the amount of light and heat passing through.

The EDW may attach to window clips on the aircraft's main windows. A reveal encompasses the EDW and may lock into place on sidewall clips.

The EDW and reveal may be removed many times during the life of an aircraft. They may be removed several times during aircraft manufacture (e.g., for customer inspection), and they may be removed periodically during aircraft maintenance to clean dust, debris and moisture between window panes.

Removal of the EDW and reveal is performed from inside an aircraft's cabin. The sidewall clips, which hold the reveal to a sidewall panel, are disengaged, and the reveal is withdrawn from an opening in the sidewall panel.

A large commercial aircraft might have at least 85 reveals, where each reveal is secured with at least six sidewall clips. Given this large number of clips, quick disengagement of the sidewall clips is desirable.

Safe removal of the sidewall clips is highly desirable. Damaging a sidewall clip during removal of the reveal is costly. The cost of a replacement clip is trivial. However, the cost of down time is not. Down time is needed to expose the sidewall panel and bond a new clip to the sidewall panel. Down time is very costly to an aircraft carrier, as an idle aircraft results in lost revenue.

SUMMARY

According to an embodiment herein, a method for removing a window reveal that is secured to an aircraft interior sidewall panel by a plurality of clips includes using a tool to disengage the clips. The tool includes a tapered portion having tips separated by a notch. Using the tool on a clip includes inserting the tapered portion into a slot in the reveal with the tab received in the notch, and pressing the tips through the slot until a back of the notch abuts against the tab and stops the movement of the tips. The notch has a depth that allows the tips to press against the clip, yet stops the tips from damaging the clip.

BRIEF DESCRIPTION OF THE DRAWINGS

FIG. 3a is an illustration of a reveal that is partially removed from the aircraft interior sidewall panel.

FIG. 3b is an illustration of a window reveal.

DETAILED DESCRIPTION

Figure 1:
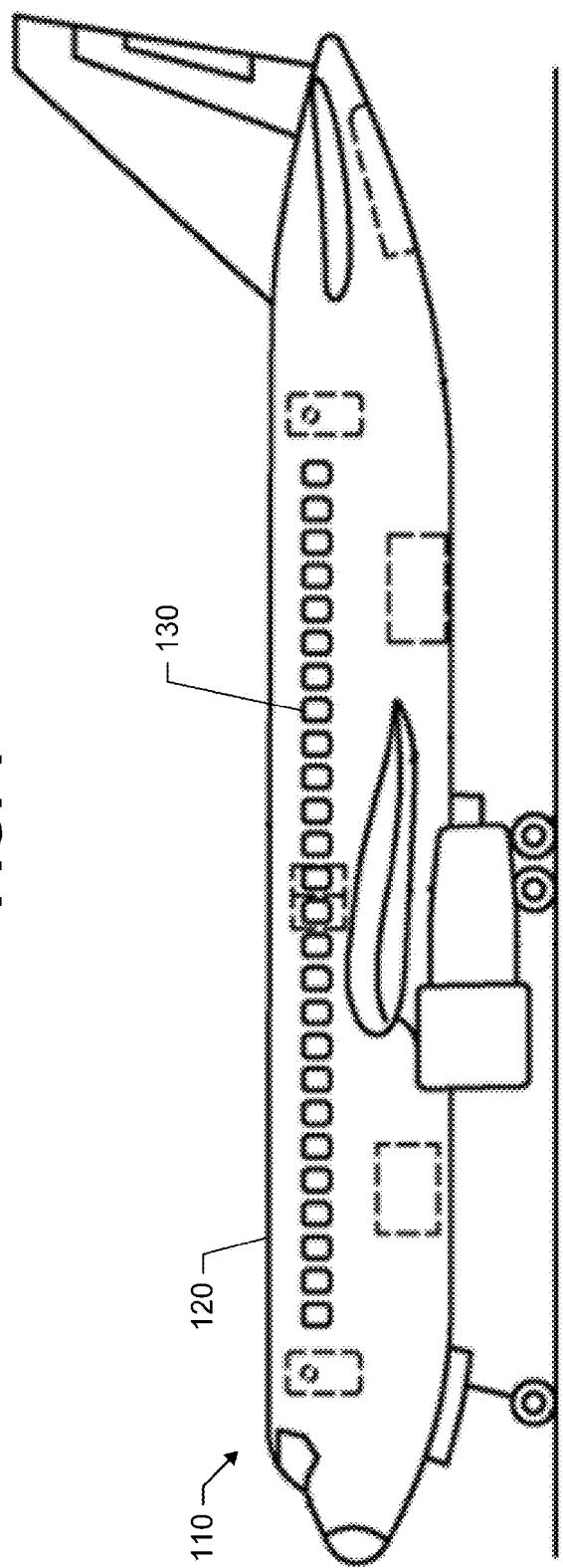
FIG. 1 is an illustration of an aircraft.

Reference is made to FIG. 1, which illustrates an aircraft 110 including a fuselage 120 having passenger windows 130. Each passenger window 130 includes an outside window system and an inside window system. In some embodiments, each inside window system may include a glass pane, pull-down shade and reveal. In other embodiments, each inside window system may include an electrochromic dimmable window and a reveal.

Figure 2:
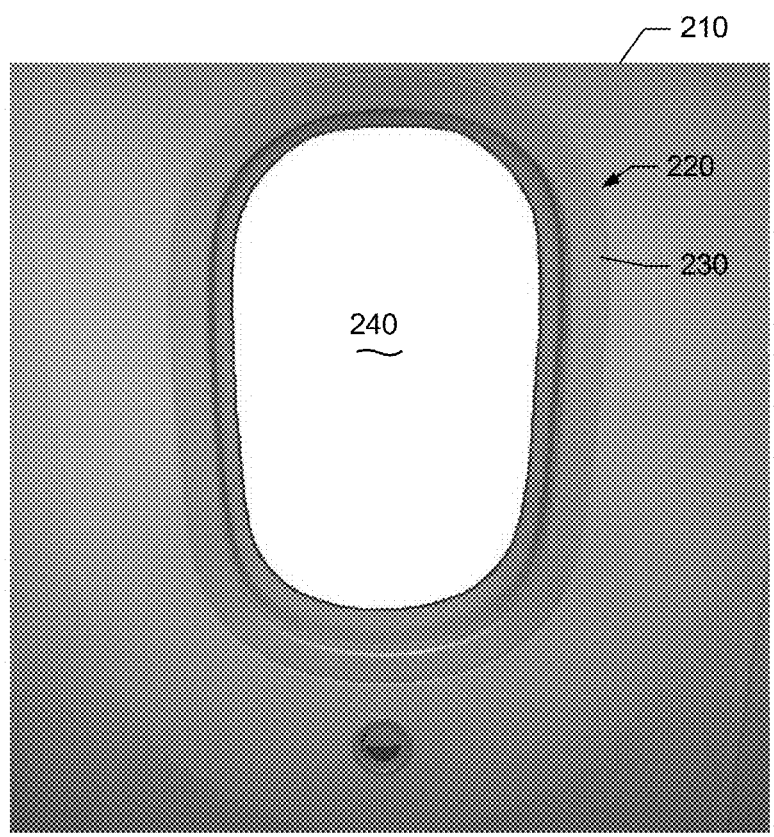
FIG. 2 is an illustration of a reveal mounted in an aircraft interior sidewall panel.

Reference is made to FIG. 2, which illustrates an aircraft interior sidewall panel 210 and a reveal 220 mounted to the sidewall panel 210. A flange 230 of the reveal 220 rests against the sidewall panel 210. An electrochromic dimmable window 240 is located within a cutout in the sidewall 210. In some embodiments, the electrochromic dimmable window 240 is attached to window clips.

Reference is made to FIG. 3a, which illustrates the reveal 220 partially removed from the sidewall panel 210. The sidewall panel 210 contains a cutout 212. A plurality of clips 214 is disposed about a periphery of the cutout 212. These clips 214 engage the reveal 220 when the reveal 220 is installed in the cutout 212.

Additional reference is now made to FIG. 3b, which illustrates a wall 222 of the reveal 220. Extending from the wall 222 is a plurality of tabs 224. Each tab 224 corresponds to a clip 214 on the sidewall panel 210. Each tab 224 is positioned to engage its corresponding clip 214 when the reveal 220 is installed in the sidewall panel 210.

The reveal wall 222 includes a plurality of pairs of slot 226. Each slot pair corresponds to a tab 224. The slots 226 of each pair are on opposite sides of a corresponding tab 224.

The slots 226 allow access to the clips 214 so the clips 214 can be disengaged from the tabs 224. A clip 214 can be disengaged by pressing it. However, if the clip 224 is pressed too far, it could be damaged.

Figure 4:
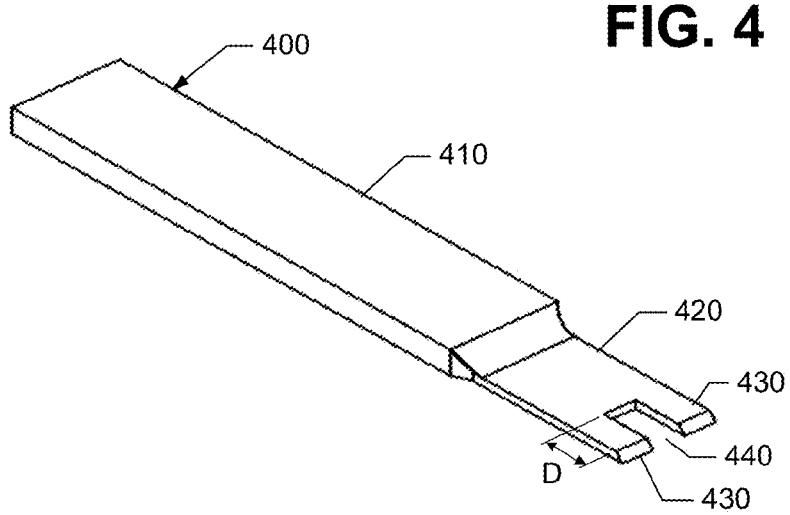
FIG. 4 is an illustration of a tool for disengaging clips that secure the reveal to the sidewall panel.

FIG. 4 illustrates a reveal removal tool 400 for safely disengaging clips 214 that secure the reveal 220 to the interior sidewall panel 210. The tool 400 includes a handle 410 and a tapered portion 420. The tapered portion 420 has two tips 430 separated by a notch 440.

Figure 5:
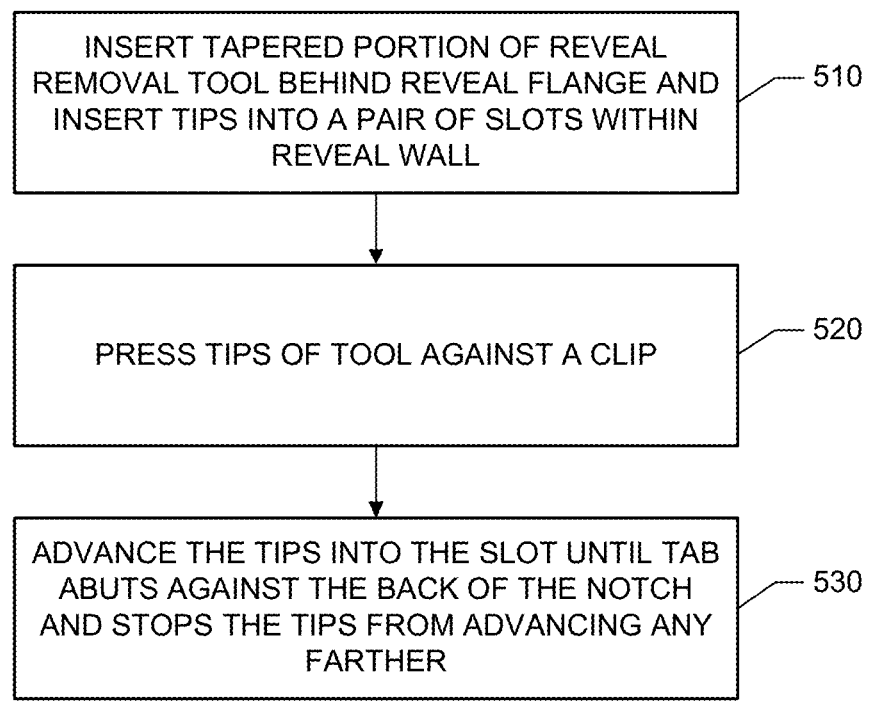
FIG. 5 is an illustration of a method of removing a window reveal from an aircraft interior sidewall panel.

Additional reference is made to FIG. 5. The tool 400 may be used as follows. The tapered portion 420 of the tool 400 is positioned behind the reveal flange 230 and the tips 430 of the tool 400 are inserted into a pair of slots 226 within the reveal wall 222 (bock 510). The tab 224 is received in the notch 440 of the tool 400. As the tips 430 advance into the slots 226, the tips 430 press against a clip 214 (block 520). The tips 430 are advanced into the slots 226 until the tab 224 abuts against the back of the notch 440 and stops the tips 430 from advancing any farther (block 530). At this point, the tips 430 are inserted far enough to disengage the clip 214 from the tab 224. However, they are not inserted far enough to damage the clip 214.

Once disengaged, the clip 224 remains disengaged. After all sidewall clips 224 have been disengaged, the reveal 220 may be completely removed from the sidewall panel 210.

Figure 6:
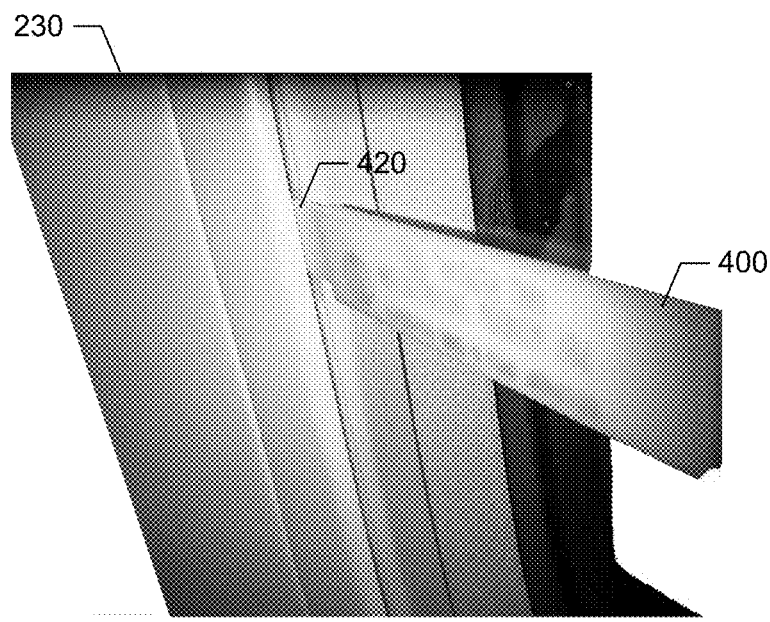
FIGS. 6 and 7 are illustrations of the reveal removal tool.
Figure 7:
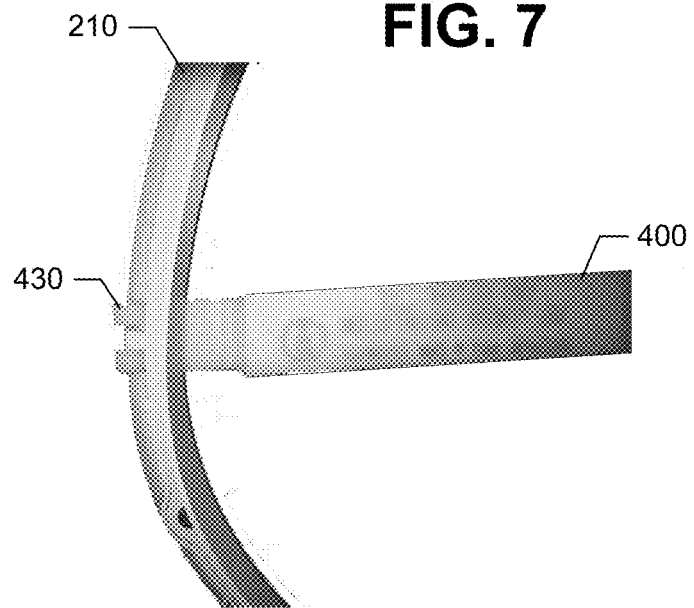

FIG. 6 illustrates the reveal removal tool 400 with the tapered portion 420 positioned behind the reveal flange 230 and the tips 430 of the tool 400 inserted into a pair of slots 226 (not shown). FIG. 7 illustrates the back side of the reveal 220, with the tool tips 430 fully inserted into the slots 226 (that is, with the tab 224 abutted against the back of the notch 440).

Width, length and thickness of the handle 410 and the tapered portion 420 of the tool 400, including width of the notch 440, are determined by the dimensions of the reveal 220. Depth (D) of the notch 440 is sufficient to enable the tips 430 to disengage the clip 214, but not deep enough to press the clip 214 too far. Thus, the notch 440 functions to limit the distance that a clip 214 is pressed. In this manner, the tool 400 avoids damaging the clips 214.

The reveal removal tool 400 may be made of a material that does not scratch glass. For example, the tool 400 may be made of, or coated with, a fluoropolymer such as Polytetrafluoroethylene (PTFE).

The method of FIG. 5 allows clips to be disengaged quickly, while protecting the clips against damage. Consequently, the method of FIG. 5 avoids costly aircraft down time due to damaged clips.

The invention claimed is:

1. A method for removing a window reveal that is secured to an aircraft interior sidewall panel by a plurality of clips, each clip engaging a tab on the reveal, the method comprising using a tool to disengage the clips, the tool including a tapered portion having tips separated by a notch, wherein using the tool on a clip includes inserting the tapered portion into a slot in the reveal with the tab received in the notch, and pressing the tips through the slot until a back of the notch abuts against the tab and stops the movement of the tips, the notch having a depth that allows the tips to press against the clip, yet stops the tips from damaging the clip.

2. The method of claim 1, further comprising using the tool to disengage additional clips securing the reveal to the sidewall pane; and withdrawing the reveal from the sidewall panel.

3. The method of claim 1, wherein an electrochromic dimmable window is also withdrawn.

\* \* \* \* \*